United States Patent
Lu et al.

(10) Patent No.: US 10,780,370 B2
(45) Date of Patent: Sep. 22, 2020

(54) MATERIAL USED FOR RAPID SEPARATION OF OIL AND WATER AND PREPARATION METHOD AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 178 days.

(21) Appl. No.: 15/852,500

(22) Filed: Dec. 22, 2017

(65) Prior Publication Data
US 2018/0178144 A1    Jun. 28, 2018

(30) Foreign Application Priority Data
Dec. 27, 2016 (CN) .......................... 2016 1 1228815

(51) Int. Cl.
*B01D 17/02* (2006.01)
*C08F 230/08* (2006.01)
(Continued)

(52) U.S. Cl.
CPC ......... *B01D 17/02* (2013.01); *B01D 17/0202* (2013.01); *B01D 39/12* (2013.01);
(Continued)

(58) Field of Classification Search
CPC ...... B01D 17/02; B01D 17/202; B01D 39/12; B01D 2239/0471; B01D 2239/0428;
(Continued)

(56) References Cited

U.S. PATENT DOCUMENTS

| 1,093,098 A | * | 4/1914 | Barnickel | C10G 33/04 |
| | | | | 516/141 |
| 1,716,481 A | * | 6/1929 | Billings | B01D 47/021 |
| | | | | 423/212 |

(Continued)

FOREIGN PATENT DOCUMENTS

| CN | 104759118 A | * | 7/2015 | |
| CN | 104998552 A | * | 10/2015 | |
| GB | 986171 A | * | 3/1965 | ............ C08F 279/04 |

OTHER PUBLICATIONS

Feng (CN-104998552) machine translation and original attached (Year: 2015).*

(Continued)

*Primary Examiner* — Liam Royce
(74) *Attorney, Agent, or Firm* — SZDC Law P.C.

(57) ABSTRACT

The present invention discloses a material used for rapid separation of oil and water and preparation method and application thereof, the mesh material is placed into monomer solution, reacting with the presence of initiator to prepare material used for rapid separation of oil and water. The monomer is divinylbenzene or 2-(dimethylamino) ethyl methacrylate, and the mesh material is stainless steel mesh. The present invention modifies the functional small molecules and polymers to the surface of the materials, thereby preparing multifunctional composite materials, effectively separating oil-water emulsion, so as to achieve the purpose of oil-water separation.

4 Claims, 4 Drawing Sheets

(51) Int. Cl.
| | |
|---|---|
| *C08F 292/00* | (2006.01) |
| *B01D 39/12* | (2006.01) |
| *C08F 12/36* | (2006.01) |
| *C08F 20/06* | (2006.01) |
| *C02F 1/00* | (2006.01) |
| *C08K 5/23* | (2006.01) |
| *C02F 1/40* | (2006.01) |
| C02F 101/36 | (2006.01) |
| C02F 101/32 | (2006.01) |

(52) U.S. Cl.
CPC ............. *C02F 1/001* (2013.01); *C08F 12/36* (2013.01); *C08F 20/06* (2013.01); *C08F 230/08* (2013.01); *C08F 292/00* (2013.01); *C08K 5/23* (2013.01); *B01D 2239/0414* (2013.01); *B01D 2239/0428* (2013.01); *B01D 2239/0471* (2013.01); *C02F 1/40* (2013.01); *C02F 2101/32* (2013.01); *C02F 2101/322* (2013.01); *C02F 2101/36* (2013.01)

(58) Field of Classification Search
CPC .. B01D 2239/0414; C08F 12/36; C08F 20/06; C08F 112/36; C08F 120/34; C02F 1/001; C02F 2101/32; C02F 2101/322; C02F 2101/36; C02F 1/40; C08K 5/23
See application file for complete search history.

(56) References Cited

U.S. PATENT DOCUMENTS

| | | | | |
|---|---|---|---|---|
| 3,826,725 | A * | 7/1974 | Schick | B01D 17/047 205/695 |
| 5,051,182 | A * | 9/1991 | Wang | B01D 17/085 210/500.27 |
| 5,627,217 | A * | 5/1997 | Rilling | B01D 67/0088 210/490 |
| 6,309,546 | B1 * | 10/2001 | Herrmann | B01D 39/12 210/500.25 |
| 6,383,386 | B1 * | 5/2002 | Hying | B01D 53/228 210/500.25 |
| 2012/0000853 | A1 * | 1/2012 | Tuteja | B01D 69/02 210/650 |
| 2014/0243464 | A1 * | 8/2014 | Debord | B01D 17/047 524/377 |
| 2018/0333683 | A1 * | 11/2018 | Liu | B01D 39/00 |

OTHER PUBLICATIONS

Wang (CN-104759118) machine translation and original attached (Year: 2015).*

Cai 2016 "facile method to fabricate a double-layer stainless steel mesh for effective separation of water-in-oil emulsions with high flux". J. Mater. Chem. A, 2016, 4, 18815-18821. (Year: 2016).*

* cited by examiner

MATERIAL USED FOR RAPID SEPARATION OF OIL AND WATER AND PREPARATION METHOD AND APPLICATION THEREOF

This application claims priority to Chinese Patent Application No.: 201611228815.0, filed on Dec. 27, 2016, which is incorporated by reference for all purposes as if fully set forth herein.

TECHNICAL FIELD

The present invention belongs to the technical field of functional materials, and particularly relates to the preparation and application of a material used for rapid separation of oil and water.

BACKGROUND TECHNIQUE

Oil and water is valuable resources to the survival of people, a lot of oil discharge into the water and lead to formation of oil-water emulsion, which not only resulting in pollution of water resources but also causing waste of valuable oil resources.

Stainless steel mesh is a kind of material which is easy to get, cheap, good stability, porous, easy to modify the surface and so on, so that it has a wide range of applications in daily life. However, because of its poor hydrophobic lipophilic performance, the oil-water mixture could not be selectively separated by it, which limits its application in wastewater treatment and separation.

SUMMARY OF THE INVENTION

The purpose of the present invention is to provide a material used for rapid separation of oil and water, and the preparation method thereof. By modifying the functional small molecules and polymers to the surface of the material, to obtain the multi-functional composite material. It can effectively separate oil and water emulsion, so as to achieve the purpose of oil and water separation.

In order to achieve the above purpose, the present invention provides the following technical solution.

A preparation method of the material used for rapid separation of oil and water, which comprises following steps: placing mesh material into monomer solution, reacting with the presence of initiator to prepare material used for rapid separation of oil and water.

In the above solution, said monomer is divinylbenzene or 2-(dimethylamino) ethyl methacrylate. The present invention modifies functional polymer on the surface of mesh material through reaction, to produce functional material with emulsion separation function. It has high efficiency to separate emulsion, fast separating speed, good reusability, and good repeatability. The product is easy to be industrialized, so as to achieve the purpose of water pollution control.

In the above solution, said mesh material is stainless steel mesh. It has good mechanical properties and good pore stability, but is not easy to modify functional polymer on the surface. In the present invention, said mesh material is first cleaned with organic solvent, then acidified, then silanated, and place in the monomer solution in the end. Thus, a polymer layer is covered on the surface of the mesh. The two-phase interface is stable. After 10 cycles, the separation efficiency and flow rate remain unchanged, so it has good reusability.

In the above solution, said initiator is azobisisobutyronitrile. It can not only initiate the monomer polymerization effectively, but also keep the uniformity of the polymerization, so as to avoid the uneven distribution of the polymer on the surface of the mesh. From the embodiment of the invention, it can be proved that under the initiation of the initiator of the present invention, the surface of the mesh is covered with a layer of polymer in very uniform formation, which is conducive to the separation efficiency and the circulation efficiency.

In the above solution, when the monomer is divinylbenzene, reacting temperature is between 50 to 70° C., reacting time is between 8 to 15 hours; when the monomer is 2-(dimethylamino) ethyl methacrylate, reacting temperature is between 60 to 80° C., reacting time is between 15 to 30 hours. According to the different monomer, different polymerization temperature and time is adopted, so that the amount of polymer on the stainless mesh and the evenness of the polymer can be better controlled, so as to achieve better separation effect.

In the above solution, when the monomer is divinylbenzene, the mass ratio of the monomer and the initiator is 400:1 to 400:5; when the monomer is 2-(dimethylamino) ethyl methacrylate, the mass ratio of the monomer and the initiator is 40:0.5 to 40:2. By adjusting the ratio of the monomer and the initiator, it can be better polymerized on the stainless steel mesh, and avoid the self-polymerization of the monomer. At the same time, the amount of the polymer on the mesh can be controlled.

In the above solution, after the reaction, said mesh material is cleaned with organic solvent, and obtain the material by vacuum drying.

The present invention also discloses the usage of the material used for rapid separation of oil and water in wastewater treatment, and in emulsion separation.

The advantages of the present invention:

1. The used raw materials are low-cost, easy to get, the synthesis route is simple, and the whole process has not used the precise expensive instrument. The products with high separation efficiency and high cycle efficiency have been prepared by a very simple method.

2. In the material of the present invention, polydivinylbenzene is a super hydrophobic polymer, and poly (2-(dimethylamino) ethyl methacrylate) can damage the stability of oil-water emulsion effectively, thus the modified stainless steel mesh can effectively separate oil-water emulsion, and because of these polymers have the advantages of high stability, good repeatability, it has good application prospect in energy and environmental protection.

3. The present invention takes the stainless steel mesh as the carrier, and uses hydrophobic polydivinylbenzene and demulsifying poly (2-(dimethylamino) ethyl methacrylate) as the surface modifier, by combining their respective properties, prepare the composite material with the function of emulsion separation. It has high separation efficiency and separation speed, good reusability, good repeatability, and the most important is that the product can be industrialized production, in order to achieve the purpose of water pollution control.

DETAILED DESCRIPTIONS

Embodiment 1

Preparation of polydivinylbenzene-modified stainless steel mesh (PDVB@SSM), the procedure is as follows:

The stainless steel mesh was washed by ethanol and acetone respectively, to remove the surface impurities of the stainless steel mesh. The treated stainless steel mesh was acidified in hydrochloric acid and placed in a toluene solution containing 0.8 g of vinyltrichlorosilane and allowed to stand at room temperature for 12 hours silanized and washed by toluene for three times and drying in a vacuum oven stand-by. A solution of 30 mL of N,N-dimethylformamide was poured into a three-neck flask, 0.8 g of divinylbenzene was added, and the mixture was stirred at room temperature for two hours. The mixed solution was deoxygenated by bubbling and finally 0.006 g of azobisisobutyronitrile (dissolved in N,N-dimethylformamide) was added, and the mixed solution was stirred in an oil bath at 60° C. for 12 hours. The stainless steel mesh was taken out and rinsed with a large amount of toluene and dried in a vacuum oven for 30 minutes to obtain a PDVB-modified stainless steel mesh.

Figure 1:
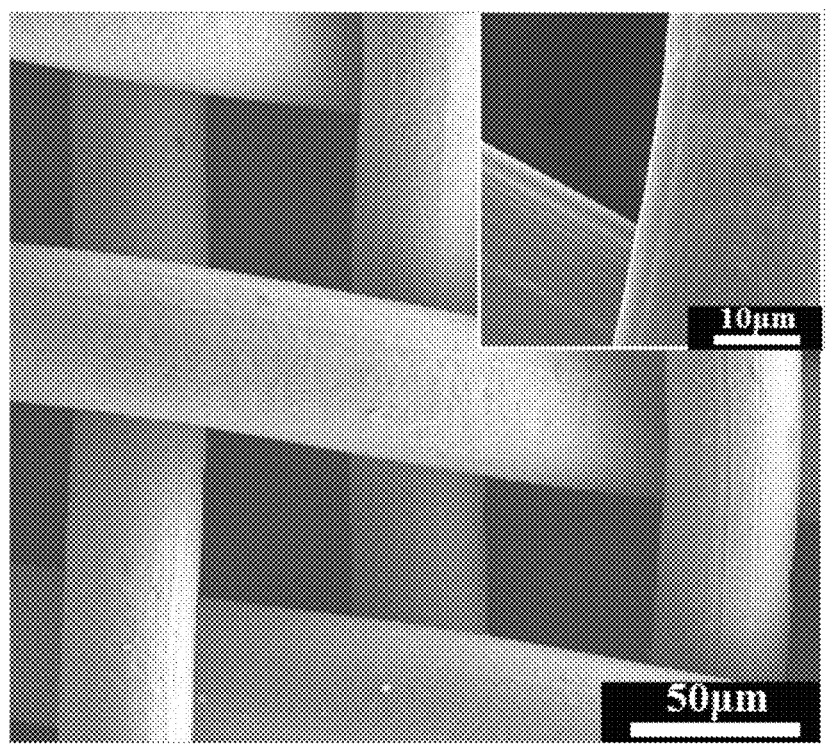
FIG. 1 is a scanning electron micrograph (SEM) of a prior stainless steel mesh.
Figure 2:
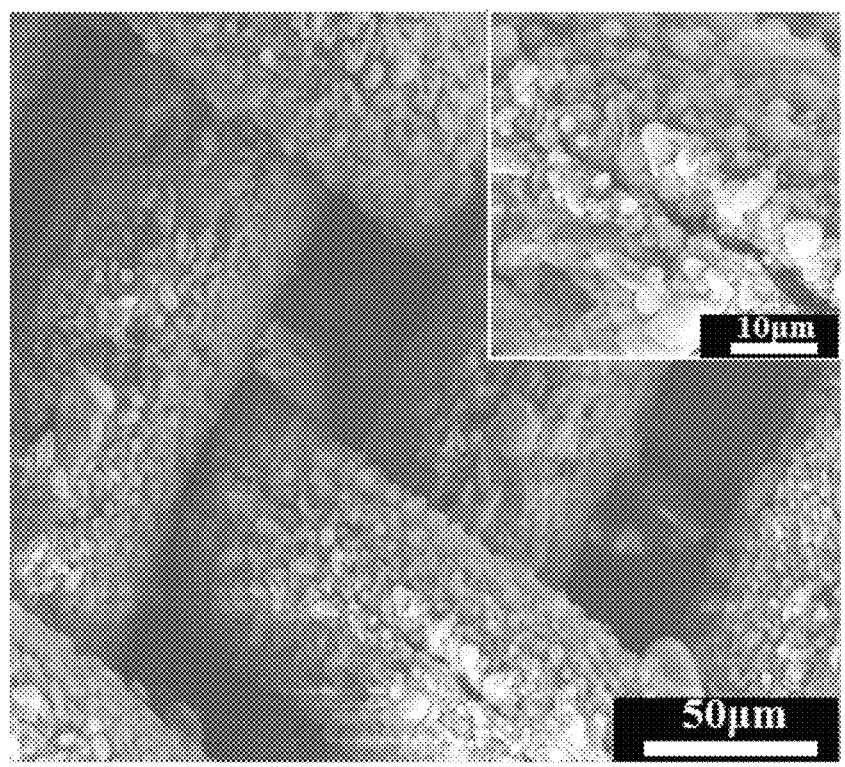
FIG. 2 shows the polydivinylbenzene-modified stainless steel mesh SEM.

FIG. 1 is a SEM of a prior stainless steel mesh, FIG. 2 shows the PDVB-modified stainless steel mesh SEM image, through the figure, it can be seen that the mesh surface is covered with a layer of PDVB polymer.

Embodiment 2

Preparation of polydivinylbenzene-modified stainless steel mesh (PDVB@SSM), the procedure is as follows:

The stainless steel mesh was washed by ethanol and acetone respectively, to remove the surface impurities of the stainless steel mesh. The treated stainless steel mesh was acidified in hydrochloric acid and placed in a toluene solution containing 0.5 g of vinyltrichlorosilane and allowed to stand at room temperature for 15 hours silanized and washed by toluene for three times and drying in a vacuum oven stand-by. A solution of 50 mL of N,N-dimethylformamide was poured into a three-neck flask, 1.0 g of divinylbenzene was added, and the mixture was stirred at room temperature for two hours. The mixed solution was deoxygenated by bubbling and finally 0.002 g of azobisisobutyronitrile (dissolved in N,N-dimethylformamide) was added, and the mixed solution was stirred in an oil bath at 50° C. for 15 hours. The stainless steel mesh was taken out and rinsed with a large amount of toluene and dried in a vacuum oven for 60 minutes to obtain a PDVB-modified stainless steel mesh.

Embodiment 3

Preparation of poly (2-(dimethylamino) ethyl methacrylate-modified stainless steel mesh (PDMAEMA@SSM), as follows:

A vinyl trichlorosilane-modified stainless steel mesh was placed in a three-necked flask, 30 mL of tetrahydrofuran was added, and then 4 g of 2-(dimethylamino) ethyl methacrylate was added and the solution was deoxygenated by bubbling at 30 minute, finally 0.1 g of azobisisobutyronitrile (dissolved in 5 mL of tetrahydrofuran) was added to the three-necked flask by injection, the mixture was stirred in an oil bath at 68° C. for 24 hours. The stainless steel mesh was taken out and washed with a large amount of tetrahydrofuran. The mesh was dried in a vacuum oven at 120° C. for 1 hour to obtain a PDMAEMA-modified stainless steel mesh.

Figure 3:
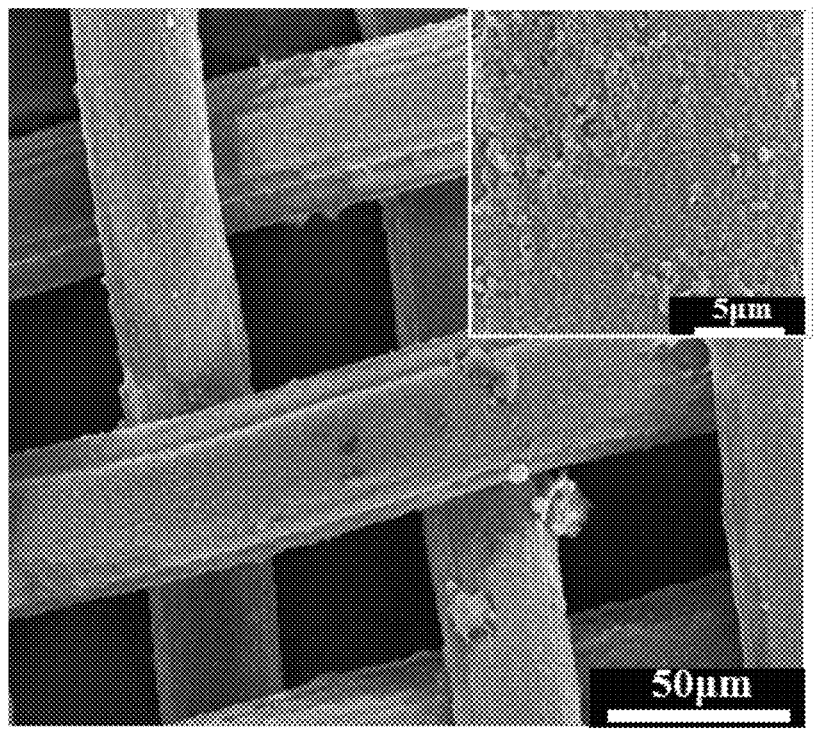
FIG. 3 is a SEM image of a stainless steel mesh modified with poly (2-(dimethylamino) ethyl methacrylate)

FIG. 3 shows the PDMAEMA modified stainless steel mesh SEM images, the polymer PDMAEMA successfully modified on the stainless steel mesh as shown in the picture.

Embodiment 4

Preparation of poly (2-(dimethylamino) ethyl methacrylate-modified stainless steel mesh (PDMAEMA@SSM), as follows:

A vinyl trichlorosilane-modified stainless steel mesh was placed in a three-necked flask, 30 mL of tetrahydrofuran was added, and then 5 g of 2-(dimethylamino) ethyl methacrylate was added and the solution was deoxygenated by bubbling at 60 minute, finally 0.05 g of azobisisobutyronitrile (dissolved in 5 mL of tetrahydrofuran) was added to the three-necked flask by injection, the mixture was stirred in an oil bath at 80° C. for 15 hours. The stainless steel mesh was taken out and washed with a large amount of tetrahydrofuran. The mesh was dried in a vacuum oven at 150° C. for 1 hour to obtain a PDMAEMA-modified stainless steel mesh.

Embodiment 5

Wetting behavior of modified stainless steel net.

Figure 4:
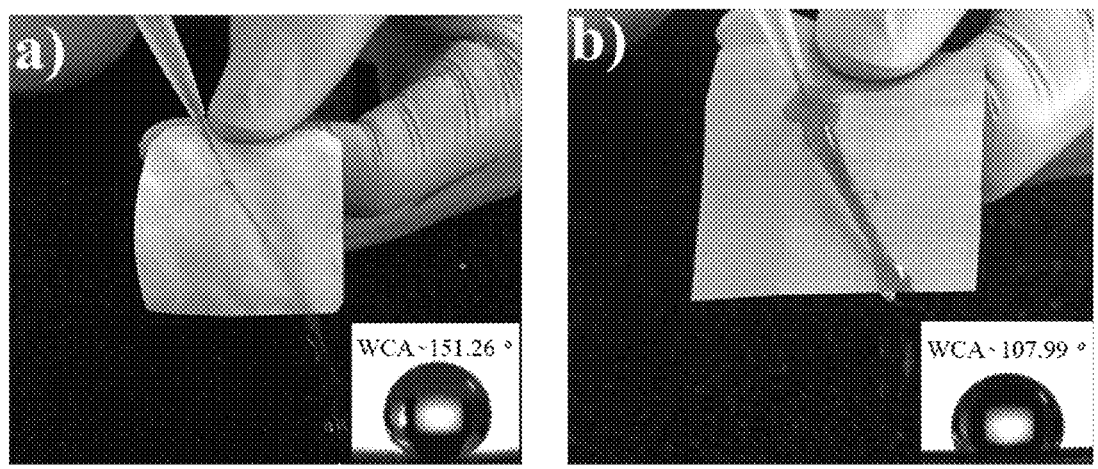
FIG. 4 is a graph showing the wettability of a stainless steel mesh after polydivinylbenzene modification.

FIG. 4 shows the water wettability of the stainless steel net before and after the PDVB modification. It can be seen that the water before the modification is easy to wet the stainless steel mesh and the water droplets adhere to the mesh. While the water droplets quickly rolled down from the modified stainless steel mesh and could not wet the mesh, illustration is the contact Angle of water. Water droplets on the surface of modified stainless steel mesh to form a spherical shape with the contact angle 151°, indicating its good hydrophobicity, the unmodified stainless steel mesh, water droplets on its surface is not spherical, further shows PDVB modified stainless steel mesh with super hydrophobicity.

Embodiment 6

Emulsion separation test, the specific steps are as follows:

5 mL of water was added to 45 mL of toluene, and then 2.5 mg of sodium dodecyl sulfonate was further added for 12 hours with ultrasound followed by an emulsion separation test.

Figure 5:
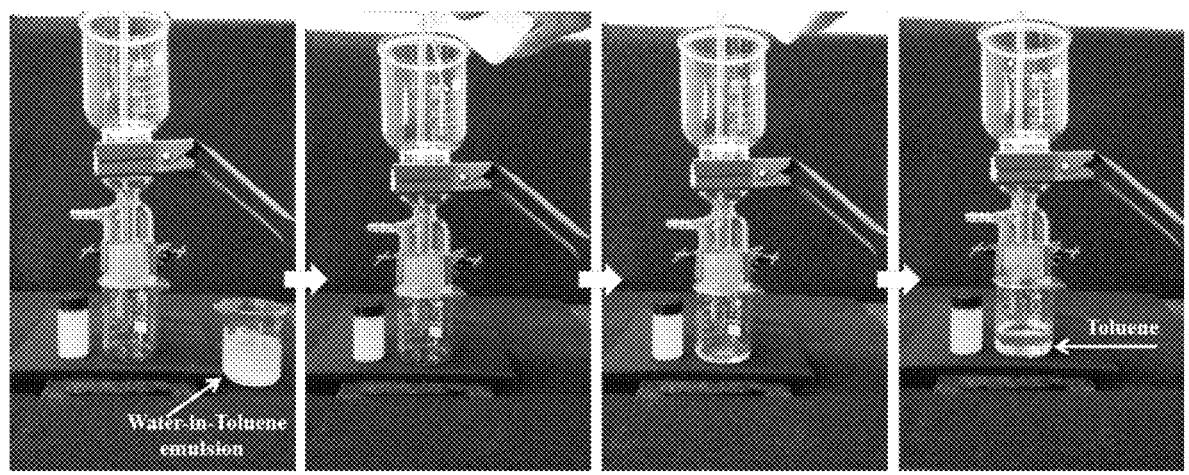
FIG. 5 shows emulsion separation effect of the modified stainless steel mesh.

Take the modified double-layer stainless steel mesh into the glass, as shown in FIG. 5 for the oil-water emulsion separation diagram, and then pour 50 mL oil-water emulsion, seen from the figure, the when the milky white oil-water emulsion into the glass with modified double-layer stainless steel mesh and clarified toluene into the beaker, indicating that it has a good emulsion separation effect.

Embodiment 7

Test of separation efficiency and flow rate of stainless steel net modified by PDVB and PDMAEMA. With steps as follows:

A variety of oil-water emulsion was separated from the prepared double layer stainless steel mesh. Then the water content in the filtrate was measured by the micro moisture detector. The separation efficiency of different oil-water emulsion was all over 99.8%.

For the determination of the separation flow rate of various emulsion, the following equation is used to calculate the flux of the modified double layer stainless steel mesh:

$$Flux = V/At$$

In which V is the volume of penetration, A is the effective filter surface ($cm^2$) of SSM, and t is the effective time. For each test, A certain amount of water/oil mixture and emulsion are poured into the filter to obtain the average value.

Figure 6:
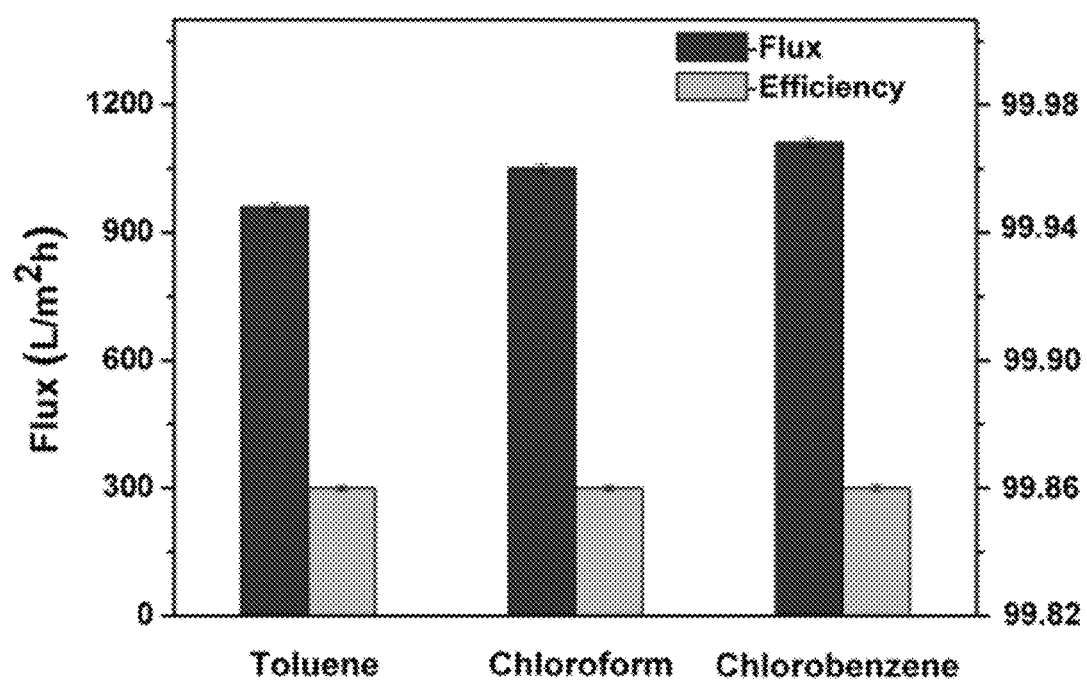
FIG. 6 shows separation efficiency and flux diagrams of the modified stainless steel mesh.

FIG. 6 is the different oil-water emulsion separation efficiency and flow, can be seen from the figure for the different emulsion has a high separation efficiency and flow.

Figure 7:
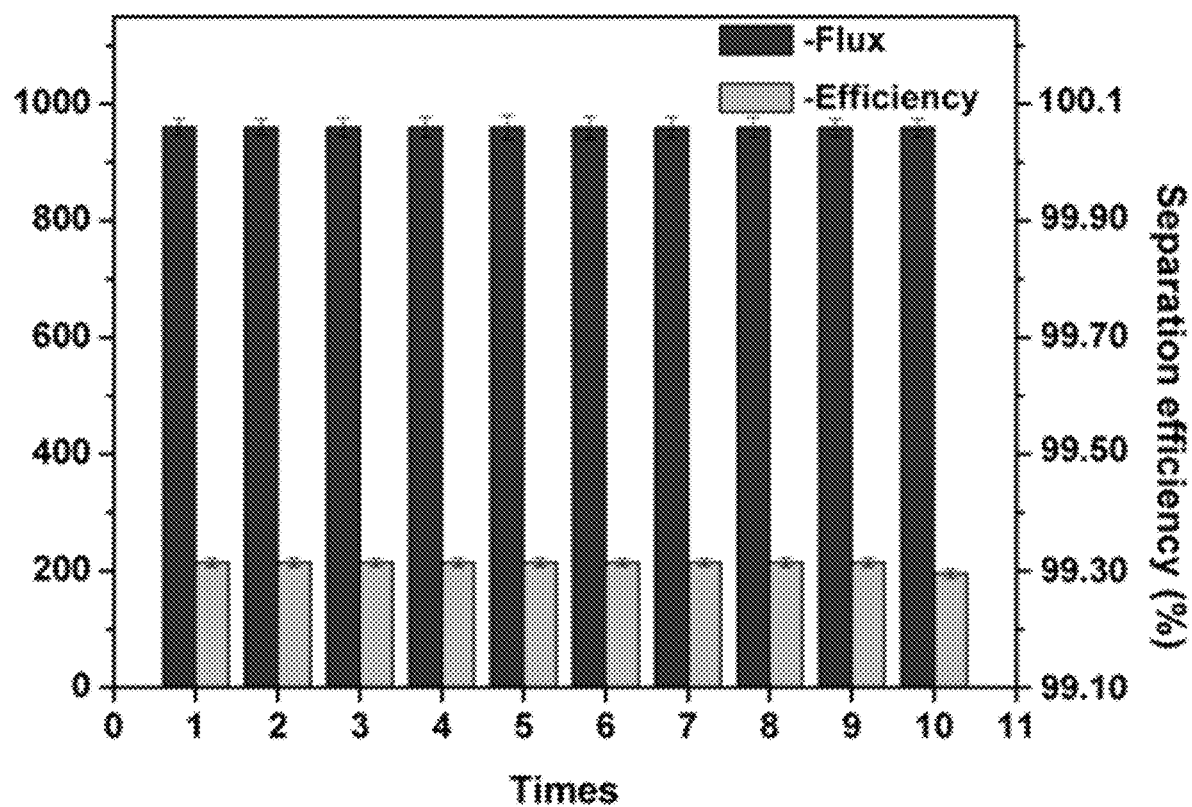
FIG. 7 shows the recycling separation efficiency and flux diagrams of the modified stainless steel mesh.

FIG. 7 is the recyclability of the test, we can see from the figure after 10 cycles also maintain a good separation efficiency and flow, which indicating a better reusability.

Embodiment 8

Separation efficiency and flow rate test of PDVB and PDMAEMA modified double layer stainless steel mesh.

With the steps of embodiment 5, the separation efficiency of different oil-water emulsion is all over 99.8%, and the flow rate is over 1000. After 10 cycles, the separation efficiency and flow rate remain very good, indicating that it has good reusability.

Through the above analysis, the surface modification method is successfully used to functionalize the stainless steel mesh, so that it has the function of separating the emulsion, and the modified stainless steel mesh has the advantages of high separation speed, high efficiency and good recyclability. The preparation method is simple and the raw material is cheap. Therefore, the wastewater treatment and emulsion separation has a very good application prospects.

The invention claimed is:

1. A preparation method of a material used for separation of oil and water, the method consisting of the following steps in a sequential order without any additional steps:
   providing a mesh material, the mesh material being a stainless steel mesh;
   cleaning the mesh material with an organic solvent;
   treating the mesh material with an acid;
   treating the mesh material with a silanating agent;
   placing the mesh material into a monomer solution; and
   reacting the monomer with the presence of an initiator at between 60 to 80° C. and for between 15 to 30 hours to prepare the material used for separation of oil and water,
   wherein the monomer is 2-(dimethylamino) ethyl methacrylate;
   wherein the initiator is azobisisobutyronitrile; and
   wherein the mass ratio of the monomer and the initiator is 40:0.5 to 40:2.

2. The preparation method of the material used for separation of oil and water according to claim 1, wherein the organic solvent is ethanol or acetone.

3. The preparation method of the material used for separation of oil and water according to claim 1, wherein the acid is hydrochloric acid.

4. The preparation method of the material used for separation of oil and water according to claim 1, wherein the silanating agent is vinyltrichlorosilane.

* * * * *